3,549,402
SILICON NITRIDE COMPOSITION
AND ARTICLES THEREOF
Ellsworth D. Whitney, Amherst, and Philip H. Crayton,
Alfred, N.Y., assignors to The Carborundum Company, Niagara Falls, N.Y., a corporation of Delaware
No Drawing. Continuation-in-part of applications Ser. No.
482,166, Aug. 24, 1965, and Ser. No. 822,094, Apr. 1,
1969, the latter being a continuation of application
Ser. No. 482,131, Aug. 24, 1965. This application May 6,
1969, Ser. No. 822,304
Int. Cl. C04b 35/58
U.S. Cl. 106—55                                                   4 Claims

ABSTRACT OF THE DISCLOSURE

A new compound lithium silicon nitride ($LiSi_2N_3$) is produced and the production of hot pressed articles from silicon nitride is improved by mixing lithium nitride or lithium silicon nitride with the silicon nitride.

BACKGROUND OF THE INVENTION

This application is a continuation-in-part of applications Ser. No. 482,166, filed Aug. 24, 1965, and Ser. No. 822,094, filed Apr. 1, 1969, the latter application being a continuation of application Ser. No. 482,131, filed Aug. 24, 1965, all now abandoned.

This application relates to silicon nitride compositions including a novel compound having the formula $LiSi_2N_3$ and is concerned with the production and use of said compositions and the molding of articles therefrom.

Silicon nitride has long been recognized as an excellent material for use when thermal stability, chemical inertness and high hardness are desired. Silicon nitride articles have been used as stator blades in high temperature gas turbines, for example. Application of silicon nitride in many areas has been seriously limited, however, due to the limitations imposed on the fabricating of articles from this material by the fact that under normal hot pressing conditions silicon nitride decomposes before extensive densification occurs. Thus great care must be exercised in forming articles of silicon nitride in order to prevent the decomposition of the material. Normally, shapes are produced by forming a "green" powder compact composed essentially of silicon and, if desired, a temporary binder. The "green" shaped compact is then reaction sintered in the presence of nitrogen at temperatures above 1250° C., the silicon reacting with the nitrogen to produce a silicon nitride shape. Articles produced in this manner are generally quite porous and thus it is common practice to coat the article with a protective glaze material to fill the pores and thus increase the resistance of the article to the attack of various chemical agents.

Attempts to produce articles having greater density and more uniform structure directly from silicon nitride by hot pressing have generally been unsuccessful since at the pressures and temperatures necessary to produce dense articles the silicon nitride begins to decompose before adequate densification can be achieved. The resulting articles do not possess the resistance to thermal shock, high hardness, wear characteristics, and mechanical strength that are to be expected of articles produced from silicon nitride. Thus, although silicon nitride would appear to be an ideal material for use as a cutting tool material because of its thermal stability and its high hardness and strength, its use is severely limited because of the difficulty in fabricating articles having all of the desired properties.

SUMMARY OF THE INVENTION

It has been discovered that silicon nitride, having incorporated therewith lithium nitride, can be hot pressed at relatively low temperatures into articles having superior strength, density and hardness characteristics as compared to articles hot pressed from silicon nitride alone or containing known additives such as $Al_2O_3$, BeO, $Mg_3N_2$ or MgO.

It has also been discovered that when silicon nitride and lithium nitride are heated together a new compound is produced which when analyzed shows: Li, 6.98%; Si, 51.2%; N, 38.2%. This composition corresponds to the formula $LiSi_2N_3$.

DESCRIPTION OF PREFERRED EMBODIMENTS

In carrying the invention the silicon nitride used was obtained from the Union Carbide Metals Company and was identified as lot 37021. X-ray diffraction analysis showed the material to consist of both alpha and beta silicon nitride. Chemical analysis gave the following composition: Si, 60.09%; N, 35.81%; C, 0.46%; and FE, 0.2%.

The lithium nitride employed was prepared according to the method of Goubeau and Anselment, "Uber ternare Metall-Boronitride," Z. anorg. u. allgem. Chem., 310, 248–260 (1961). In this procedure lithium metal is placed in an iron boat and the boat is inserted into a ceramic tube situated in a high temperature split furnace. After thoroughly flushing the tube with dry nitrogen the boat is heated to approximately 600° C. for one hour while the nitrogen flow is continued. After the heating operation the material is cooled in the nitrogen atmosphere. The yield of lithium nitride is about 99% of the theoretical yield.

The preparation of the novel compound, lithium silicon nitride, which is believed to be formed in accordance with the equation:

$$Li_3N + 2Si_3N_4 \rightarrow 3LiSi_2N_3$$

is described in the following two examples.

EXAMPLE 1

Stoichiometric quantities of silicon nitride and lithium nitride were reacted at 1200° C. in a nitrogen atmosphere at normal pressure for 1 hour. A resistance-heated tube furnace was employed and the reacting materials were mixed and placed in an alumina boat for heating in the furnace. The reaction product was cooled in a nitrogen atmosphere.

The resulting product was a soft, gray white powder which when analyzed, showed the composition mentioned above.

The following table sets out the X-ray diffraction data for this compound.

TABLE A

| Miller indices, hkl. | Observed interplanar spacing, d. obs. | Calculated interplanar spacing, d. calc. | Δd | I/I₀ |
|---|---|---|---|---|
| 003 | 4.595 | 4.589 | .006 | 100 |
| 110 | 3.300 | 3.289 | .011 | 100 |
| 202 | 2.650 | 2.632 | .018 | 100 |
| 114 | 2.384 | 2.378 | .006 | 80 |
| 006 | 2.316 | 2.295 | .019 | 80 |
| 211 | 2.114 | 2.127 | −.013 | |
| 212 | 2.065 | 2.055 | .010 | |
| 206 | 1.773 | 1.787 | −.014 | |
| 008 | 1.737 | 1.721 | .016 | |
| 207 | 1.631 | 1.618 | .013 | |
| 009 | 1.530 | 1.530 | 0 | |
| 313 | 1.502 | 1.494 | .008 | |
| 225 | 1.404 | 1.412 | −.008 | |
| 307 | 1.363 | 1.366 | −.003 | |
| 404 | 1.325 | 1.316 | .009 | |
| 320 | 1.306 | 1.307 | −.001 | |
| 322 | 1.288 | 1.284 | .004 | |
| 308 | 1.275 | 1.275 | 0 | |
| 317 | 1.231 | 1.232 | −.001 | |
| 1.1.11 | 1.172 | 1.170 | .002 | |
| 1.2.10 | 1.160 | 1.160 | 0 | |
| 335 | 1.017 | 1.018 | −.001 | |
| 3.1.11 | .9812 | .9809 | .0003 | |
| 601 | .9473 | .9470 / .9477 | .0003 / −.0004 | |
| 3.2.10 | | | | |
| 605 | .8984 | .8974 | .0010 | |
| 526 | .8471 | .8475 | .0004 | |
| 615 | .8284 | .8283 | .0001 | |

The X-ray diffraction pattern described above is new and does not correlate with any of the published ASTM X-ray diffraction data.

It has been found that the novel lithium silicon nitride ($LiSi_2N_3$) may be formed by reaction between lithium nitride and silicon nitride at temperatures as low as 1200° C. and as high as 1900° C.

As stated above it has been discovered that silicon nitride may be satisfactorily hot pressed at relatively low temperatures, i.e., about 1395° C. to 1900° C., to form dense, hard articles if lithium silicon nitride is incorporated therewith. Lithium nitride may be added as such to the silicon nitride or it may be added as the compound $LiSi_2N_3$. In the former case the added lithium nitride apparently reacts with the silicon nitride particles to form lithium silicon nitride ($LiSi_2N_3$) on the surface of the particles as the mixture is heated. Examples of the alternative procedures are set forth below.

EXAMPLE 2

A high density silicon nitride shape containing 5% lithium nitride, based on the weight of silicon nitride, was produced in the following manner. Forty grams of 0.5 micron silicon nitride were mixed with 2 grams of finely divided lithium nitride. The powders were blended in trichloroethylene and the mixture was allowed to dry, after which it was thoroughly broken up. The dried, broken mixture was then placed in a graphite mold and heated to a temperature of 1750° C. at a pressure of 2600 p.s.i.

The material pressed easily and it was noted that there was no reaction of the material with the mold. The resulting article had a density of 3.04 gms./cc., a hardness of 95.4 on the Rockwell 15 N scale and flexural strength of 33,712 p.s.i.

EXAMPLE 3

A mix was prepared consisting of 5% of $LiSi_2N_3$, prepared as in Example 1 except that the reaction was carried out at 1900° C., and 95% of silicon nitride. The mix was placed in a graphite mold and a pressure of about 2600 p.s.i. was applied. The temperature was gradually raised. Densification began at a surface mold temperature of 1395° C. The temperature was allowed to rise to about 1800° C. and then the mold was allowed to cool and the pressed body was removed. The body had a density of 2.94 gms./cc., a hardness of 94.8 on the Rockwell 15 N scale and a modulus of rupture of 28,100 p.s.i.

EXAMPLE 4

Lithium silicon nitride ($LiSi_2N_3$) was prepared in accordance with Example 1. A mix was prepared consisting of 45% of the lithium silicon nitride and 55% silicon nitride. The mix was placed in a graphite mold and pressed at a temperaurte of about 1750° C. and a pressure of 4000 p.s.i. The resulting body had a density of 3.04 gms./cc., a hardness of 96.3 on the Rockwell 15 N scale, and a modulus of rupture of 35,500 p.s.i.

In other experiments mixes containing 50% $Si_3N_4$-50% $LiSi_2N_3$, 30% $Si_3N_4$-70% $LiSi_2N_3$, and 10% $Si_3N_4$-90% $LiSi_2N_3$ were hot pressed for 30 minutes at temperatures of 1395° C. and 1750° C. At each temperature tests were made at 2600 p.s.i. and at 4000 p.s.i. It was found that the densities of the resultant articles were good, being on the average approximately 93% of the theoretical density. The hardness of the artciles was also high, in some tests as much as 95 on the Rockwell 15 N scale.

The amount of lithium silicon nitride which may be used to obtain improvement in hot pressing of silicon nitride may be as small as 0.1%. On the other hand amounts of the order of 99% may also be used. Thus bodies ranging in composition from 1% to 99% lithium silicon nitride and 99% to 1% silicon nitride may be produced. In fact, it has been discovered, lithium silicon nitride ($LiSi_2N_3$) alone can be satisfactorily hot pressed to form dense, hard articles. The results of four runs are shown in the following table:

TABLE B

| Hot pressing conditions | | | Percent theoretical density | Maximum hardness* |
|---|---|---|---|---|
| ° C. | p.s.i. | Minutes | | |
| 1,395 | 2,600 | 30 | 98.3 | 97 |
| 1,395 | 4,000 | 30 | 98.4 | 92 |
| 1,750 | 2,600 | 30 | 99.8 | 96.8 |
| 1,750 | 4,000 | 30 | 98.1 | 95 |

*Hardness on Rockwell 15 N scale.

The superiority of lithium nitride as a densifying additive in the hot pressing of silicon nitride was demonstrated in comparative tests as set forth in the following example:

EXAMPLE 5

A series of discs ⅜ inch thick and having a diameter of 4 inches were hot pressed from silicon nitride and 5%, based on the silicon nitride, of various additives. In addition to discs formed from a mix consisting of $Si_3N_4$-5% $Li_3N$, discs were hot pressed from mixes consisting of $Si_3N_4$-5% MgO, $Si_3N_4$-5% $Mg_3N_2$ and $Si_3N_4$-5% $MgAl_2O_4$. The discs were all pressed under the same conditions as set forth in Example 2. Table C shows the comparative results obtained when lithium nitride is used as a densifying additive for silicon nitride as contrasted with the other additives.

TABLE C

Effects of additives on the theoretical density of silicon nitride bodies pressed at 1750° C.

| Additive: | Percent of theoretical density |
|---|---|
| 5% $Li_3N$ | 90 |
| 5% MgO | 85 |
| 5% $MgAl_2O_4$ | 83 |
| 5% $Mg_3N_2$ | 70 |

Experiments were also carried out with various additives at temperatures between 1200° C. and 1900° C. to determine their effects on the densification of silicon nitride. It was found that between 1500° C. and 1750° C. lithium nitride provided the greatest densification, thus by using lithium nitride as such or as $LiS_2N_3$, as a densifying additive a silicon nitride article of high density can be produced by conventional hot pressing methods substantially below the decomposition temperature of silicon nitride. By fabricating at these lower temperatures partial decomposition of the silicon nitride is substantially avoided. The resulting articles have properties superior to hot pressed silicon nitride articles using other materials as additives.

In hot pressing silicon nitride or lithium silicon nitride in accordance with the invention pressures as low as 2000 p.s.i. may be used. However, pressures in the range from about 2600 to 4000 p.s.i. are preferred. Even higher pressures may be employed but their use provides no significant improvement. As with other hot pressing operations, the minimum time required will vary and depend upon other factors, such as time, pressure, and composition. In some cases the time required for pressing to desired density may be of the order of only a few minutes.

In addition to the use of the modified dense silicon nitride of this invention for the fabrication of cutting tools, articles may be produced from this material where great thermal stability is required, such as stator blades in gas turbines. In addition articles may be produced where thermal shock resistance coupled with high electrical resistivity is desired, such as electrical insulators subject to violent changes in temperature. Other uses for the material of this invention are the production crucibles, thermocouple sheaths, and non-wettable containers for melting zone refining, crystal growing, and diffusion operations.

While the invention has been described in connection with specific embodiments thereof, it will be understood that it is capable of further modification, and this application is intended to cover any variation, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the terms of the appended claims.

Except as otherwise indicated, parts and percentages referred to herein are parts and percentages by weight.

What is claimed is:

1. A compound, lithium silicon nitride, which has a characteristic X-ray diffraction pattern having lines of greatest intensity at: 4.595, 3.300, 2.650, 2.384 and 2.316 angstroms and has a composition consisting essentially of 38.2% nitrogen, 6.98% lithium and 51.2% silicon.

2. A dense, hot pressed body consisting essentially of the lithium silicon nitride defined in claim 1.

3. A dense, hot pressed body consisting essentially of a mixture of 1% to 99% silicon nitride and 99% to 1% of the lithium silicon nitride defined in claim 1.

4. A process for producing a dense body which comprises subjecting a mixture of 1% to 99% silicon nitride and 99% to 1% lithium silicon nitride to a pressure of at least about 2000 p.s.i. and a temperature between about 1395° C. and 1900° C.

References Cited

UNITED STATES PATENTS 2,866,685   12/1958   Lam et al. _____ 23—191

FOREIGN PATENTS 245,762   10/1926   Great Britain _____ 23—191

JAMES E. POER, Primary Examiner

U.S. Cl. X.R.

23—191